(12) United States Patent
Ma

(10) Patent No.: US 10,458,796 B2
(45) Date of Patent: Oct. 29, 2019

(54) NAVIGATION SYSTEM AND METHOD THEREOF

(75) Inventor: Jianjun Ma, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 326 days.

(21) Appl. No.: 14/391,966

(22) PCT Filed: Jul. 11, 2012

(86) PCT No.: PCT/CN2012/078502
§ 371 (c)(1),
(2), (4) Date: Oct. 10, 2014

(87) PCT Pub. No.: WO2014/008641
PCT Pub. Date: Jan. 16, 2014

(65) Prior Publication Data
US 2015/0120191 A1    Apr. 30, 2015

(51) Int. Cl.
*G01C 21/00*     (2006.01)
*G06F 16/29*     (2019.01)
*G01C 21/36*     (2006.01)

(52) U.S. Cl.
CPC ......... *G01C 21/00* (2013.01); *G01C 21/3623* (2013.01); *G06F 16/29* (2019.01)

(58) Field of Classification Search
CPC ................................................ G01C 21/3623
See application file for complete search history.

(56) References Cited

U.S. PATENT DOCUMENTS

| 7,487,042 B2 | 2/2009 | Odamura |
| 2003/0060971 A1 | 3/2003 | Millington et al. |
| 2005/0222767 A1 | 10/2005 | Odamura |

(Continued)

FOREIGN PATENT DOCUMENTS

| CN | 1677057 A | 10/2005 |
| CN | 101063611 A | 10/2007 |

(Continued)

OTHER PUBLICATIONS

International Search Report and Written Opinion for corresponding Appln. No. PCT/CN2012/078502, dated Apr. 18, 2013, 10 pages.

(Continued)

*Primary Examiner* — Imran K Mustafa
(74) *Attorney, Agent, or Firm* — Brooks Kushman P.C.

(57) ABSTRACT

A navigation system is disclosed. The navigation system includes an image capturing device, a positioning device, and a processing device. The image capturing device is configured to capture an image of an object fed by a user. The positioning device is configured to obtain positioning information of the navigation system. The processing device is configured to: calculate a feature code based on features of a logo in the image; retrieve a piece of address information of a location corresponding to the feature code from a database; and calculate a route from the current location to the location corresponding to the piece of address using the positioning information and the piece of address information. A navigation method is also provided.

17 Claims, 3 Drawing Sheets

(56) References Cited

U.S. PATENT DOCUMENTS

2008/0051991 A1*  2/2008  Lee .................... G01C 21/3623
                                                     701/533
2008/0055655 A1   3/2008  Chiba et al.
2010/0250126 A1*  9/2010  Epshtein ............ G01C 21/3602
                                                     701/438

FOREIGN PATENT DOCUMENTS

| CN | 101561494    | 10/2009 |
| WO | 2007021996 A2 | 2/2007 |
| WO | 2010120901 A1 | 10/2010 |

OTHER PUBLICATIONS

Chinese Office Action for corresponding Application No. 201280074547.5, dated Oct. 9, 2016, 7 pages.

* cited by examiner

NAVIGATION SYSTEM AND METHOD THEREOF

CROSS-REFERENCE TO RELATED APPLICATION

This application is the U.S. national phase of PCT Application No. PCT/CN2012/078502 filed on 11 Jul. 2012, the disclosure of which is incorporated in its entirety by reference herein.

TECHNICAL FIELD

The present disclosure generally relates to a navigation system and a navigation method thereof.

BACKGROUND

Nowadays, navigation systems based on Global Positioning System (GPS) are widely used in vehicles. However, in a conventional navigation system, a user needs to manually input text address of a destination, and it is dangerous for a driver to do so when driving.

Therefore, there is a need to provide a navigation system and method thereof which does not require a user to manually input text addresses or names of destinations.

SUMMARY

According to one embodiment of the present disclosure, a navigation system is provided. The navigation system includes an image capturing device, a processing device, and a positioning device. The image capturing device is configured to capture an image of an object fed by a user. The positioning device is configured to obtain positioning information of the navigation system. The processing device is configured to: calculate a feature code based on features of a logo in the captured image; retrieve a piece of address information of a target location corresponding to the feature code from a database; and calculate a route from the current location to the target location using the positioning information and the piece of address information.

In some embodiments, the processing device calculates the feature code using a scale invariant feature transform (SIFT) algorithm.

In some embodiments, the database may contain a plurality of feature codes, a plurality pieces of address information corresponding to the plurality of feature codes, and a plurality of location names corresponding to the plurality of feature codes.

In some embodiments, a piece of address information may include text address and/or the latitude and the longitude of the corresponding location.

In some embodiments, the processing device is further configured to determine whether a barcode is contained in the image, if YES, the processing device is further configured to: retrieve the piece of address information of the target location corresponding to the barcode from the database; if NO, calculate the feature code based on the features of the logo.

In some embodiments, the database may contain a plurality of barcodes, a plurality pieces of address information corresponding to the plurality of barcodes, and a plurality of location names corresponding to the plurality of barcodes.

In some embodiments, the barcode may be a one-dimensional barcode or a two-dimensional barcode such as quick response code (QR code).

According to another embodiment of the present disclosure, a navigation method is provided. The navigation method includes: capturing an image of an object fed by a user; calculating a feature code based on the features of a logo in the captured image; retrieving from a database a piece of address information of a target location corresponding to the feature code; obtaining positioning information of the current location; and calculating a route from the current location to the target location using the positioning information and the piece of address information.

In some embodiments, the database may contain a plurality of feature codes, a plurality pieces of address information corresponding to the plurality of feature codes, and a plurality of location names corresponding to the plurality of feature codes.

In some embodiments, the navigation method further includes determining whether a barcode is contained in the image; if YES, retrieving from the database the piece of address information of the target location corresponding to the barcode; if NO, calculating the feature code based on the features of the logo in the captured image.

In some embodiments, the feature code is calculated by using a scale invariant feature transform (SIFT) algorithm.

Compared with the conventional solutions, embodiments of this disclosure have the following advantages.

A user does not have to input text address or location names of a destination word by word, which is time-saving, convenient and safer. Further, by acquiring a barcode in the image, a piece of address information of a location corresponding to the barcode can be retrieved, which also avoids the user inputting text address or location names of a destination manually.

In addition, a piece of address information may include the latitude and the longitude of a location corresponding to a logo. Therefore, the navigation system may calculate a route based on the latitude and longitude coordinates, not merely on the electronic geographical map (E-map), which thereby greatly reduces the possibility of failing to navigation in the event that the E-map is not updated in time.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
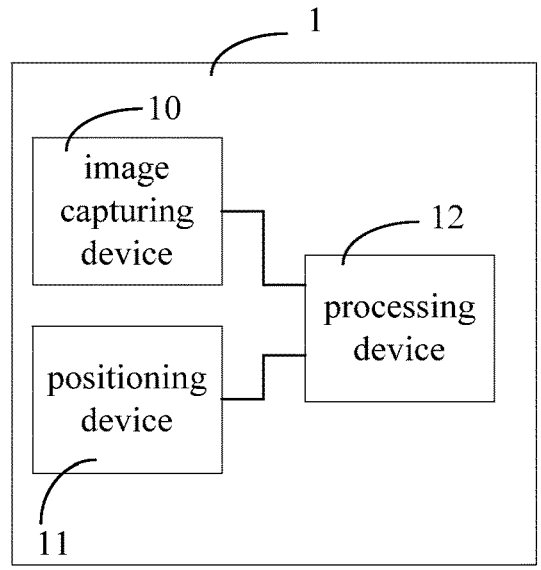
FIG. 1 illustrates a schematic block diagram of a navigation system according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In one embodiment of the present application, a navigation system is provided. FIG. 1 illustrates a schematic block diagram of a navigation system according to one embodiment of the present disclosure. Referring to FIG. 1, the navigation system 1 includes an image capturing device 10, a positioning device 11, and a processing device 12. In some embodiments, the navigation system 1 is configured in a head unit of a vehicular system.

The image capturing device 10 is configured to capture an image of an object fed by a user. The captured image is transmitted to the processing device 12 for address information and then for navigation. In some embodiments, the image capturing device 10 may be a camera or a scanner.

The positioning device 11 is configured to obtain positioning information of the navigation system which is transmitted to the processing device 12 for navigation. In some embodiments, the positioning device 11 may be a GPS device, and the positioning information may be the longitude and the latitude of the navigation system 1.

The processing device 12 is configured to: calculate a feature code based on features of a logo in the captured image; retrieve a piece of address information of a target location corresponding to the feature code from a database; and calculate a route from the current location to the target location using the positioning information and the piece of address information. In some embodiments, the processing device 12 may be a processor such as a CPU, or any other suitable processing device.

In some embodiments, the processing device 12 calculates the feature code by using a scale invariant feature transform (SIFT) algorithm. It should be noted that each logo has a unique feature code. The SIFT algorithm is known to those skilled in the art, which is not described in detail herein.

In some embodiments, the processing device 12 is further configured to determine whether a barcode is contained in the image. If YES, the processing device 12 is further configured to: retrieve the piece of address information of the target location corresponding to the barcode from the database; if NO, calculate the feature code based on the features of the logo.

In some embodiments, the image may have a logo or a barcode. The logo or barcode may be presented in printed items, such as an advertisement in a piece of paper, a product package, or a label attached on a certain object, which can be an identification of a specific product or service. Each specific product/service corresponds to specific addresses where the product/service is manufactured or provided. That is, the logo or barcode implies location name and address information, which can be retrieved by using the navigation system according to the present disclosure.

The logo may be a text and/or a symbol. The barcode may be a one-dimension barcode or two-dimension barcode. For example, the barcode may be a Quick Response Code (QR code).

Figure 2:
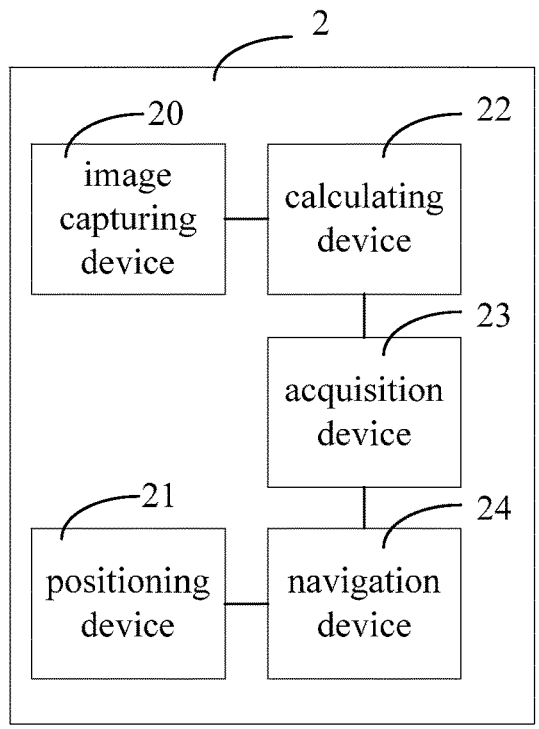
FIG. 2 illustrates a schematic block diagram of a navigation system according to one embodiment of the present disclosure.

FIG. 2 illustrates a schematic block diagram of a navigation system according to one embodiment of the present disclosure. Referring to FIG. 2, the navigation system 2 includes an image capturing device 20, a positioning device 21, a calculating device 22, an acquisition device 23, and a navigation device 24. Specifically, the calculating device 22 is configured to calculate a feature code based on features of a logo in the captured image. The acquisition device 23 is configured to retrieve a piece of address information of a target location corresponding to the feature code from a database. And the navigation device 24 is configured to calculate a route from the current location to the target location using the positioning information and the piece of address information. The functions of image capturing device 20 and the positioning device 21 are similar to that of the image capturing device 10 and the positioning device 11, respectively, and are not described in detail herein.

In some embodiments, the navigation system 2 may further include an image preprocessing device (not shown in FIG. 2) which is configured to process the raw image so that the image can be recognized by the calculating device 22 to calculate the feature code. For example, the image preprocessing device may perform gradation correction and shape correcting on the image.

In some embodiments, the database may be stored in a server which is capable of communicating with the navigation system to provide address information. For example, the server may communicate with the navigation system via a network. The network may be a wireless mobile communication network, such as a 3G or a 4G network. In some embodiments, the database may be stored in a data storage device incorporated in the navigation system.

Figures 3, 4:
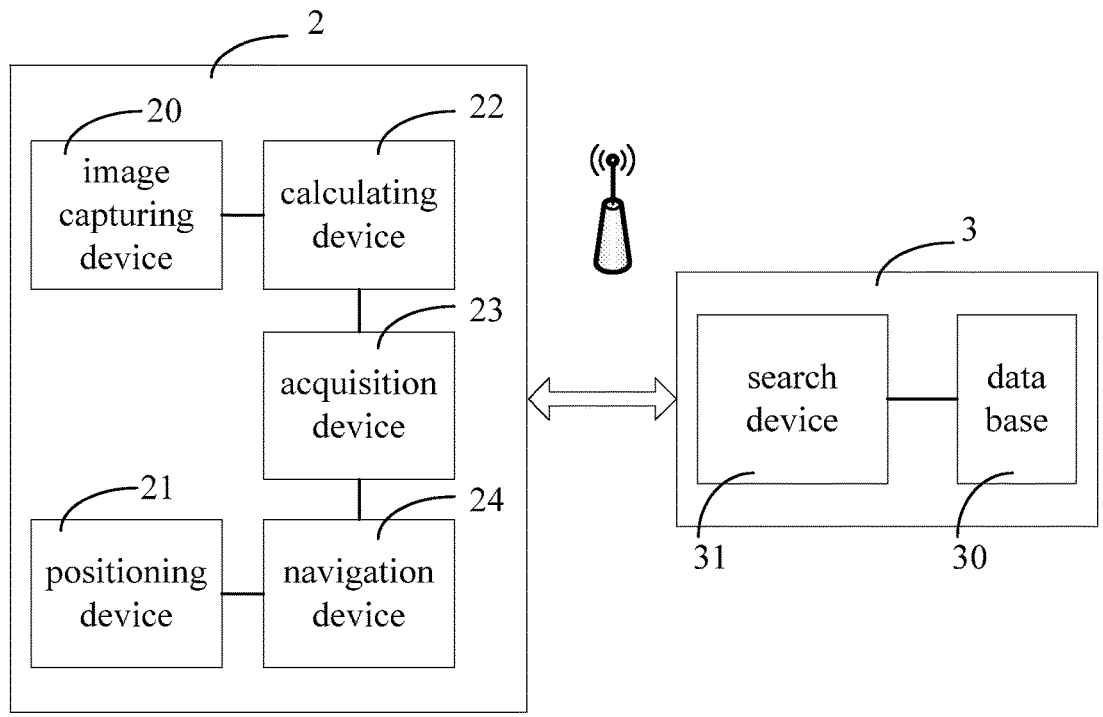
FIG. 3 illustrates a block diagram of a navigation system in communication with a server according to one embodiment of the present disclosure.
FIG. 4 illustrates an example data structure of a database for storing feature codes and corresponding address information.

FIG. 3 illustrates a block diagram of a navigation system in communication with a server according to one embodiment of the present disclosure. Referring to FIG. 3, the server 3 is located in a place far away from a vehicle having the navigation system 2. The acquisition device 23 communicates with the server 3 via a 3G or a 4G mobile network to retrieve a piece of address information of a target location corresponding to a feature code generated by the calculating device 22. In some embodiments, the server 3 may include a database 30 and a search device 31.

The database 30 may be established based on any known database software. The hardware configuration of the database 30 may be any hardware platform capable of supporting the database. For example, the database 30 may be a computer readable memory or storage device.

In some embodiments, the database 30 may contain a plurality of feature codes, a plurality pieces of address information corresponding to the plurality of feature codes, and a plurality of location names corresponding to the plurality of feature codes. In some embodiments, the database 30 further contains a plurality of barcodes, a plurality pieces of address information corresponding to the plurality of barcodes, and a plurality of location names corresponding to the plurality of barcodes. A feature code or a barcode contained in the database 30 may be in the form of a binary code.

A piece of address information may include text address and/or the latitude and the longitude of a corresponding location which can be utilized to calculate a route by the navigation device 24.

Optionally, the database 30 may further store electronic geographical map, based on which route guidance can also be executed.

The search device 31 is configured to search in the database the address information by comparing a feature code calculated based on features of a logo by the calculating device 22 with the plurality of feature codes contained in the database. The search result including the address information is then transmitted to the acquisition device 23 via a 3G or a 4G network. Then the address information is transmitted to the navigation device 24 for calculating a route.

FIG. 4 illustrates an example data structure of a database for storing feature codes and corresponding address information. Referring to FIG. 4, feature code 0001 corresponds to two pieces of address information A and B, feature code 0010 corresponds to one piece of address information C, and feature code 0100 corresponds to two pieces of address information D and E. In practice, it is possible that multiple address information corresponds to one feature code. For example, in this case, company "Abc" has two branch offices in different places. If the feature code calculated based on the features of the logo "Abc" is 0001, both of the address information A and B will be provided to the user for selection.

It should be noted that the logo, feature codes, and address information shown in FIG. 4 are provided for illustration, which does not tend to limit the scope of the present application.

In some embodiments, the navigation system 2 may further include a display device (not shown in drawings), for displaying positioning information, address information and/or route guidance information. In some embodiments, an audio device, such as a speaker, may be used to report the address information and guide the user to travel.

Figure 5:
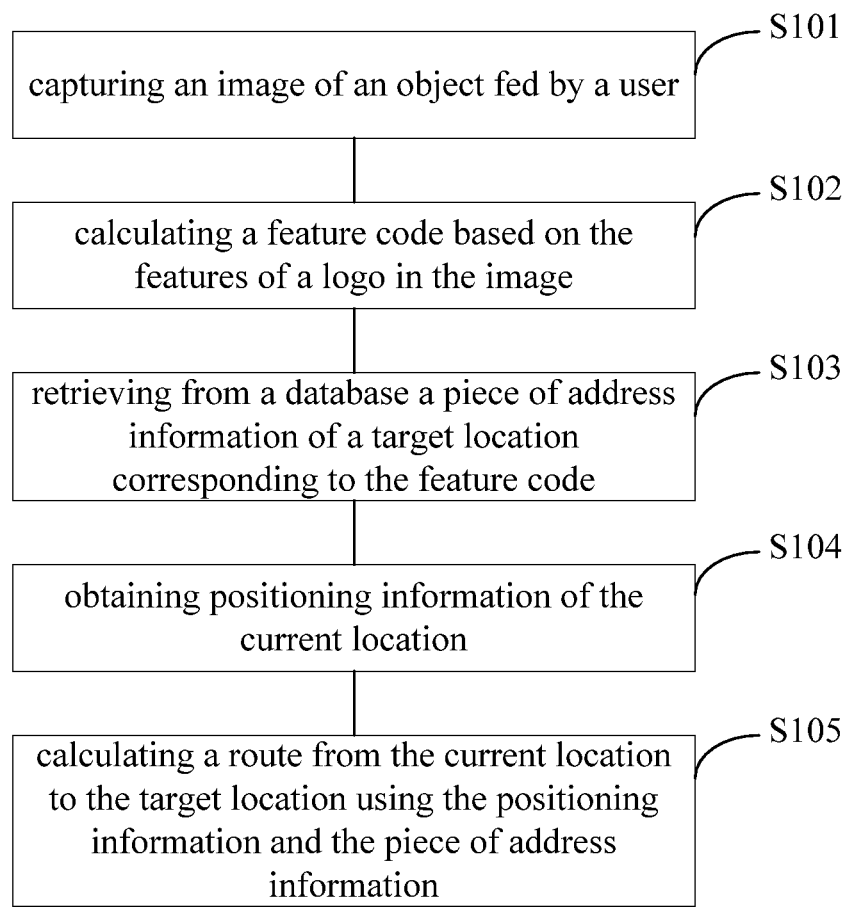
FIG. 5 illustrates a schematic flow chart of a navigation method according to one embodiment of the present disclosure.

In another embodiment of the present application, a navigation method implemented by the navigation system is also provided. FIG. 5 illustrates a schematic flow chart of a navigation method according to one embodiment of the present disclosure. The navigation method S100 includes: S101, capturing an image of an object fed by a user; S102, calculating a feature code based on the features of a logo in the captured image; S103, retrieving from a database a piece of address information of a target location corresponding to the feature code; S104, obtaining positioning information of the current location; and S105, calculating a route from the current location to the target location using the positioning information and the piece of address information.

In some embodiments, the navigation method S100 further includes: determining whether a barcode is contained in the image; retrieving from the database the piece of address information of the target location corresponding to the barcode; if NO, calculating the feature code based on the features of the logo in the captured image.

The navigation method S100 will be described in detail with reference to exemplary embodiments.

If a user wants to go to a place which is related to a logo or a barcode on a commodity or any object the user has, the user may use the navigation system and the navigation method of the present disclosure to generate a route to the place based on the logo or barcode. In this exemplary embodiment, a logo is taken as an example. Referring to FIG. 3 and FIG. 5, in S101, an image of the logo fed by the user is captured by an image capturing device 20.

Referring to FIG. 3 and FIG. 5, in S102, the image captured by the image capturing device 10 is transmitted to a calculating device 22 to calculate a feature code based on the features of the logo in the image.

If the captured image is recognizable for the calculating device 22, the image is analyzed, for example, using a scale invariant feature transform (SIFT) algorithm, to create a feature code. Besides the SIFT algorithm, other known image processing algorithm may be employed. It should be noted that each logo has a unique feature code.

Otherwise, if the captured image is not recognizable for the calculating device 22, a preprocessing may be performed by a preprocessing device to the raw image until the image is recognizable. Then the image after preprocessed is analyzed using the SIFT algorithm to create a unique feature code.

Referring to FIG. 3 and FIG. 5, in S103, a piece of address information of a target location corresponding to the feature code is retrieved by an acquisition device 23. In some embodiments, the address information may be retrieved from a server 3 with the database stored therein, or the address information may be retrieved from a data storage device incorporated in the navigation system 2 which data storage device has the database stored therein.

In this exemplary embodiment, referring to FIG. 3, the acquisition device 23 retrieves the address information from a server 3 which communicates with the navigation system 2 via a wireless mobile communication network, such as a 3G or a 4G network.

The server 3 has a database 30 therein to store a plurality of feature codes, a plurality pieces of address information corresponding to the plurality of feature codes, and a plurality of location names corresponding to the plurality of feature codes. The server 3 may further includes a search device 31 to search in the database the address information.

Specifically, the search device 31 searches in the database 30 the address information by comparing the feature code calculated based on features of a logo by the calculating device 22 with the plurality of feature codes contained in the database 30. If one of the feature codes in the database 30 is identified same as the calculated feature code, the address information of a location corresponding to the feature code is retrieved by the acquisition device 23. Then the address information is transmitted to the navigation device 24.

It should be noted that a piece of address information may include text address and/or the latitude and the longitude of the corresponding location.

Referring to FIG. 3 and FIG. 5, in S104, positioning information of the current location is obtained by a positioning device 21. The positioning device 21 may be a GPS device, which is well known in the art, and is not described in detail herein. The positioning information is the longitude and the latitude of the navigation system.

Referring to FIG. 3 and FIG. 5, in S105, by using the positioning information and the piece of address information, a route from the current location to the target location is calculated by a navigation device 24.

It is noted that after obtaining positioning information or address information, the method of the present disclosure may also include providing the positioning information or address information to the user through a video device or an audio device for confirmation and/or selection, and the navigation route is also provided to the user through a video or an audio device to perform guidance.

In some embodiments, if multiple pieces of address information are found, the multiple pieces of address information are displayed to the user for selection, for example, through a pop-up window, or through an audio player.

If the search result is not what the user desires, the user may proceed to a new navigation process which includes: capturing an image of an object, calculating a feature code based on features of a logo in the image, retrieving a piece of address information of a location corresponding to the feature code, obtaining positioning information of the current location, and calculating a route. If no feature code matches with that calculated based on features of a logo in the image, a failure report is displayed on the display or reported through the audio device to let the user know.

An example of how to get to a location is further provided. Referring to FIG. 4 and FIG. 5, a driver wants to go to "Abc" company, and a drink bottle with the logo "Abc" happens to be on a vehicle. The driver may show the drink bottle in front of an image capturing device, such as a camera mounted on the vehicle. The image containing the logo "Abc" is captured by the camera. A feature code 0001 is calculated based on features of the logo "Abc" in the image, as shown in FIG. 4. Then, two pieces of address information A and B corresponding to the feature code 0001 are retrieved from a database. The address information A and B is displayed to the driver to make a selection. Positioning information of the navigation system can be obtained by a positioning device. Thereafter, by using the positioning information and the selected piece of address information, a route from the current location to the target location corresponding to the logo "Abc" is calculated to provide route guidance for the driver.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A navigation system, comprising:
   an image capturing device, configured to capture an image of an object fed by a user;
   a positioning device, configured to obtain positioning information of the navigation system; and
   a processing device, configured to calculate a feature code based on features of a logo in the captured image; retrieve a piece of address information of a target location corresponding to the feature code from a database; and calculate a route from a current location to the target location using the positioning information and the piece of address information, wherein the processing device is further configured to:
   determine whether a barcode is contained in the image;
   retrieve the piece of address information of the target location corresponding to the barcode from the database in response to determining that the barcode is contained in the image; and
   calculate the feature code based on the features of the logo in response to determining that the barcode is not contained in the image.

2. The navigation system according to claim 1, wherein the piece of address information of the target location is a text address.

3. The navigation system according to claim 1, wherein the piece of address information of the target location is a latitude and a longitude of the target location.

4. The navigation system according to claim 1, wherein the processing device calculates the feature code using a scale invariant feature transform algorithm.

5. The navigation system according to claim 1, wherein the positioning device is a Global Positioning System (GPS) device, and the positioning information is a longitude and a latitude of the navigation system.

6. A navigation method, comprising:
   capturing an image of an object fed by a user;
   calculating a feature code based on features of a logo in the captured image;
   retrieving from a database a piece of address information of a target location corresponding to the feature code;
   obtaining positioning information of a current location;
   calculating a route from the current location to the target location using the positioning information and the piece of address information;
   determining whether a barcode is contained in the image;
   retrieving from the database the piece of address information of the target location corresponding to the barcode in response to determining that the barcode is contained in the image; and
   calculating the feature code based on the features of the logo in the captured image in response to determining that the barcode is not contained in the image.

7. The navigation method according to claim 6, wherein the piece of address information of the target location is text address.

8. The navigation method according to claim 6, wherein the piece of address information of the target location is a latitude and a longitude of the target location.

9. The navigation method according to claim 6, wherein the positioning information is a longitude and a latitude of the current location.

10. The navigation system of claim 1 wherein the logo is indicative of one of a product and service.

11. The navigation method of claim 6 wherein the logo is indicative of one of a product and service.

12. A navigation system comprising:
    an image capturing device configured to capture an image of an object;
    a positioning device configured to obtain positioning information of the navigation system; and
    a processing device configured to:
    calculate a feature code based on features of a logo indicating one of a product and service in the captured image;
    retrieve a piece of address information of a target location corresponding to the feature code from a database; and
    calculate a route from a current location to the target location using the positioning information and the piece of address information,
    wherein the processing device is further configured to:
    determine whether a barcode is contained in the image;
    retrieve the piece of address information of the target location corresponding to the barcode from the database in response to determining that the barcode is contained in the image; and
    calculate the feature code based on the features of the logo in response to determining that the barcode is not contained in the image.

13. The navigation system of claim 12, wherein the piece of address information of the target location is a text address.

14. The navigation system of claim 12, wherein the piece of address information of the target location is a latitude and a longitude of the target location.

15. The navigation system of claim 12, wherein the processing device is further configured to calculate the feature code using a scale invariant feature transform algorithm.

16. The navigation system of claim 12, wherein the positioning device is a Global Positioning System (GPS) device, and the positioning information is a longitude and a latitude of the navigation system.

17. The navigation system of claim 12, wherein the image capturing device is further configured to capture the image of the object as provided by a user.

* * * * *